United States Patent
Mattsson et al.

(10) Patent No.: US 10,440,568 B2
(45) Date of Patent: Oct. 8, 2019

(54) AUTHENTICATION OF WIRELESS DEVICE ENTITY

(71) Applicant: TELEFONAKTIEBOLAGET LM ERICSSON (PUBL), Stockholm (SE)

(72) Inventors: Ulf Mattsson, Kungsbacka (SE); Victor Manuel Avila Gonzalez, Madrid (ES); Anders Lundström, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 135 days.

(21) Appl. No.: 15/029,725

(22) PCT Filed: Oct. 17, 2013

(86) PCT No.: PCT/EP2013/071685
§ 371 (c)(1),
(2) Date: Apr. 15, 2016

(87) PCT Pub. No.: WO2015/055246
PCT Pub. Date: Apr. 23, 2015

(65) Prior Publication Data
US 2016/0262018 A1    Sep. 8, 2016

(51) Int. Cl.
*H04L 29/06* (2006.01)
*H04W 12/06* (2009.01)
(Continued)

(52) U.S. Cl.
CPC .......... *H04W 12/06* (2013.01); *H04L 63/107* (2013.01); *H04W 12/08* (2013.01); *H04W 12/12* (2013.01); *H04W 12/1208* (2019.01)

(58) Field of Classification Search
CPC .............. H04L 63/1458; H04L 63/0236; H04L 63/1408; H04L 67/10; H04L 2463/142
See application file for complete search history.

(56) References Cited

U.S. PATENT DOCUMENTS 7,506,368 B1 * 3/2009 Kersey ................ H04L 63/0428
                                                        726/12
7,836,493 B2 * 11/2010 Xia ..................... H04L 63/0807
                                                        726/9
(Continued)

FOREIGN PATENT DOCUMENTS

WO    2014004590 A2    1/2014
WO    WO 2014004590 A2 * 1/2014 ........... A61B 5/0022

OTHER PUBLICATIONS

International Search Report and Written Opinion dated Jun. 24, 2014, in International Application No. PCT/EP2013/071685, 12 pages.
(Continued)

*Primary Examiner* — Sher A Khan
(74) *Attorney, Agent, or Firm* — Rothwell, Figg, Ernst & Manbeck, P.C.

(57) ABSTRACT

The embodiments herein relate to a method in a wireless device (101) for enabling trusted communication between a wireless device entity (101*a*) and a second network node (105) via a first network node (103). The wireless device (101) and the first network node (103) are adapted to communicate using a secure communication channel. The wireless device (101) transmits a message to the first network node (103) using the secure communication channel. The message comprises information indicating that the wireless device entity (101*a*) is comprised in a trusted zone of the wireless device (101). The trusted zone is at least partly trusted by the first network node (103).

14 Claims, 7 Drawing Sheets

(51) Int. Cl.
*H04W 12/08* (2009.01)
*H04W 12/12* (2009.01)

(56) References Cited

U.S. PATENT DOCUMENTS

| | | | | |
|---|---|---|---|---|
| 7,930,414 | B2* | 4/2011 | Choudhury | H04L 67/12 709/227 |
| 7,996,892 | B2* | 8/2011 | Pomerantz | H04L 63/0428 713/152 |
| 8,051,474 | B1* | 11/2011 | Bedin | H04L 63/105 713/151 |
| 8,438,628 | B2* | 5/2013 | Shah | H04L 63/0428 380/255 |
| 8,700,892 | B2* | 4/2014 | Bollay | H04L 63/166 713/153 |
| 8,782,414 | B2* | 7/2014 | Patiejunas | H04L 9/3273 709/227 |
| 8,869,305 | B1* | 10/2014 | Huang | G06F 21/604 380/258 |
| 9,172,620 | B2* | 10/2015 | Demmer | H04W 4/02 |
| 9,363,090 | B1* | 6/2016 | Paczkowski | H04L 63/10 |
| 2002/0157019 | A1* | 10/2002 | Kadyk | H04L 63/0281 726/4 |
| 2002/0163522 | A1* | 11/2002 | Porter | G06F 12/1441 345/533 |
| 2004/0168052 | A1* | 8/2004 | Clisham | H04L 63/0428 713/153 |
| 2005/0044227 | A1* | 2/2005 | Haugh | H04L 29/06 709/226 |
| 2008/0107067 | A1* | 5/2008 | Baek | H04L 29/06027 370/328 |
| 2009/0150665 | A1* | 6/2009 | Kaippallimalil | H04L 63/062 713/153 |
| 2009/0168695 | A1* | 7/2009 | Johar | G07C 9/00111 370/328 |
| 2011/0126265 | A1* | 5/2011 | Fullerton | G06F 21/53 726/4 |
| 2016/0262018 | A1* | 9/2016 | Mattsson | H04L 63/107 |
| 2017/0195884 | A1* | 7/2017 | Kang | H04L 63/10 |

OTHER PUBLICATIONS

Bugiel et al. "Practical and Lightweight Domain Isolation on Android" Security and Privacy in Smartphones and Mobile Devices, ACM, 2011, pp. 51-62.

Mulliner et al. "Taming Mr Hayes: Mitigating Signaling Based Attacks on Smartphones" Dependable Systems and Networks (DSN), 2012, IEEE, 12 pages.

* cited by examiner

AUTHENTICATION OF WIRELESS DEVICE ENTITY

CROSS REFERENCE TO RELATED APPLICATION(S)

This application is a 35 U.S.C. § 371 National Phase Entry Application from PCT/EP2013/071685, filed Oct. 17, 2013, designating the United States, the disclosure of which is incorporated herein in its entirety by reference.

TECHNICAL FIELD

Embodiments herein relate generally to a wireless device, a method in the wireless device, a first network node and a method in the first network node. More particularly the embodiments herein relate to enabling trusted communication between a wireless device entity and a second network node via the first network node.

BACKGROUND

AAA, which is short for Authentication, Authorization and Accounting, is a protocol for controlling a wireless device's (or its user's) access to network resources. AAA is important for efficient network management and security.

Authentication may be described a process by which a wireless device and a network check if the other party has an authority to communicate with each other, i.e. the process of adding or denying individual wireless device access to a network and its resources. Authentication on both sides should be passed for the communication to proceed, i.e. the wireless device and network mutually authenticate each other. For example, a user must enter a valid user name and password before access is granted. The process of authentication is based on each wireless device or its user having a unique set of criteria for gaining access. An AAA server compares a user's authentication credentials with other user credentials stored in a database. If the credentials match, the user is granted access to the network. If the credentials are at variance, authentication fails and network access is denied.

A wireless device or its user may be given different authorization levels that limit its access to the network and associated resources. Authorization may be based on geographical location restrictions, date or time-of-day restrictions, frequency of logins or multiple logins by single individuals or entities. Other associated types of authorization services may comprise route assignments, Internet Protocol (IP) address filtering, bandwidth traffic management and encryption.

Today, most solutions build on wireless device or end-user authentication. Authentication of the wireless device or end-user only works if the wireless device or end-user is not "evil", meaning that it does not try to fool the server or network node, i.e. that it is not associated with a fraud third party.

SUMMARY

An objective of embodiments herein is therefore to obviate at least one of the above disadvantages and to provide improved communication between the wireless device entity and a second network node.

According to a first aspect, the object is achieved by a method in a wireless device for enabling trusted communication between the wireless device entity and a second network node via a first network node. The wireless device and the first network node are adapted to communicate using a secure communication channel. The wireless device transmits a message to the first network node using the secure communication channel. The message comprises information indicating that a wireless device entity is comprised in a trusted zone of the wireless device. The trusted zone is at least partly trusted by the first network node.

According to a second aspect, the object is achieved by a method in the first network node for enabling trusted communication between the wireless device entity and the second network node via the first network node. The wireless device and the first network node are adapted to communicate using the secure communication channel. The first network node receives the message from the wireless device using the secure communication channel. The message comprises information indicating that the wireless device entity is comprised in the trusted zone of the wireless device. The trusted zone is at least partly trusted by the first network node. The first network node determines that communication from the wireless device entity can be trusted since it has received the information indicating that the wireless device entity is comprised in the trusted zone of the wireless device.

According to a third aspect, the object is achieved by the wireless device which is adapted to enable trusted communication between the wireless device entity and the second network node via the first network node. The wireless device and the first network node are adapted to communicate using the secure communication channel. The wireless device comprises a transmitter which is adapted to transmit the message to the first network node using the secure communication channel. The message comprises information indicating that the wireless device entity is comprised in the trusted zone of the wireless device. The trusted zone is at least partly trusted by the first network node.

According to a fourth aspect, the object is achieved by the first network node which is adapted to enable trusted communication between wireless device entity and the second network node via the first network node. The wireless device and the first network node are adapted to communicate using the secure communication channel. The first network node comprises a receiver which is adapted to receive the message from the wireless device using the secure communication channel. The message comprises information indicating that the wireless device entity is comprised in the trusted zone of the wireless device. The trusted zone is at least partly trusted by the first network node. The first network node comprises a determining unit which is adapted to determine that communication from the wireless device entity can be trusted since it has received the information indicating that the wireless device entity is comprised in the trusted zone of the wireless device.

Since the first network node receives information, via the secure communication channel, indicating that the wireless device entity is comprised in a trusted zone, the first network node knows that this is the real wireless device. The first network node can then open a network node port which is reserved only for communication between the wireless device entity and the second network node. The network node port is blocked from access by other wireless device entities in non-trusted zones of the wireless device. Thereby, the wireless device entity and the second network node can communicate with each other in a way that is trusted.

Embodiments herein afford many advantages, of which a non-exhaustive list of examples follows:

An advantage of at least some of the embodiments herein is that they provide a method to secure authentication of the wireless device entity which is close to fool proof.

Another advantage of at least some of the embodiments herein is that they are easy to implement and does not require any extra signaling, i.e. existing signaling is used.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

As mentioned above, today most authentication procedures build on wireless device or end-user authentication. The embodiment herein instead uses authentication of a certain wireless device entity comprised in the wireless device.

If a certain wireless device entity comprised in a wireless device shall communicate with a server/node in the network, it must be secured that the wireless device entity is the real entity and not a fraud third party entity. In other words, the communication between the wireless device entity and the second network node can be trusted.

Figure 1:
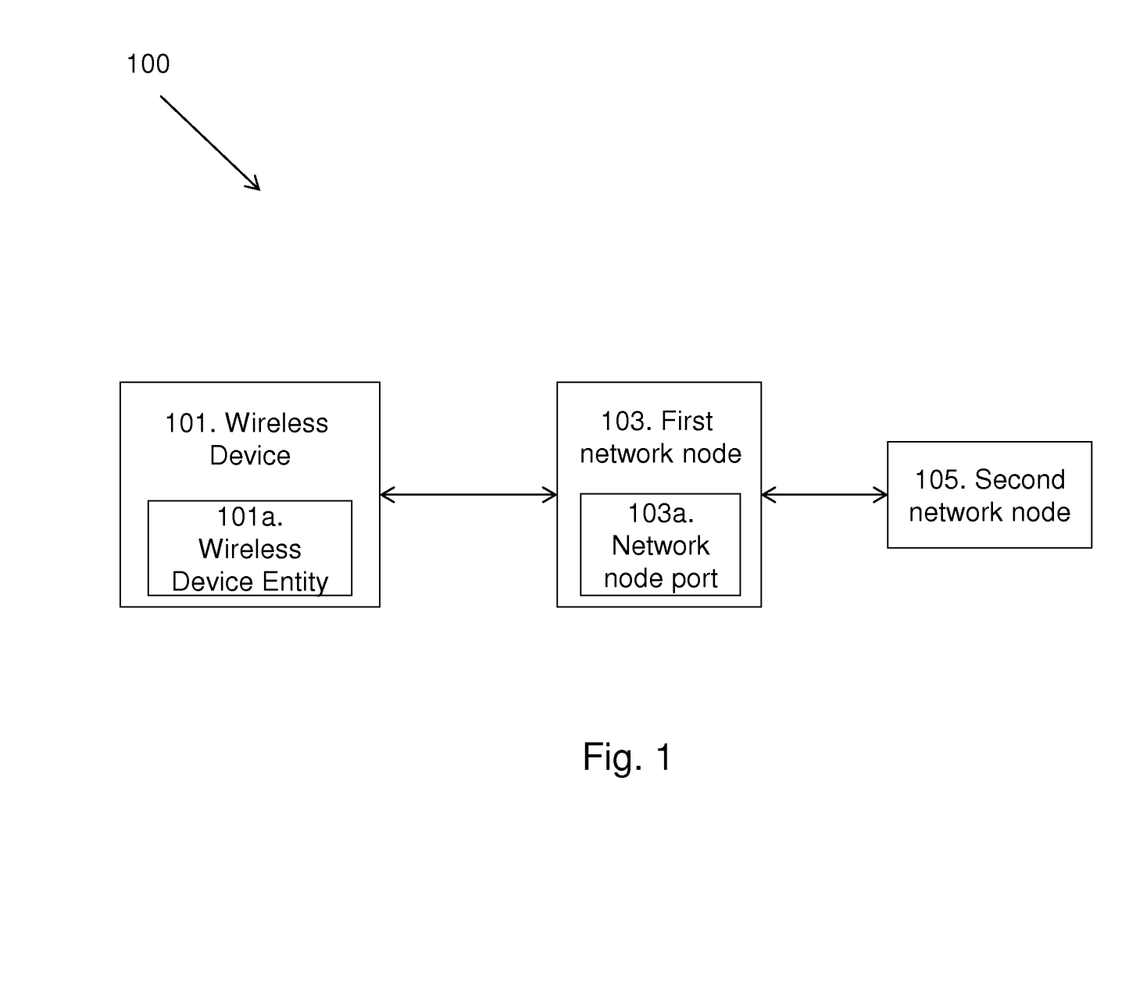
FIG. 1 is a schematic block diagram illustrating embodiments of a communication system.

FIG. 1 depicts a communication network 100 in which embodiments herein may be implemented. The communication network 100 may in some embodiments apply to one or more radio access technologies, wired or wireless, such as for example Long Term Evolution (LTE), LTE Advanced, Wideband Code Division Multiple Access (WCDMA), Global System for Mobile Communications (GSM), or any other Third Generation Partnership Project (3GPP) radio access technology, or other radio access technologies such as WiFi and Wireless Local Area Network (WLAN).

The communication network 100 comprises a wireless comprising a wireless device entity 101a. The wireless device 101 may be a device by which a subscriber may access services offered by an operator's network and services outside the operator's network to which the operator's radio access network and core network provide access, e.g. access to the Internet. The wireless device 101 may be any device, mobile or stationary, enabled to communicate over a radio channel in the communication network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device 101 may be portable, pocket storable, hand held, computer comprised, or vehicle mounted devices, enabled to communicate voice and/or data, via the radio access network, with another entity, such as another wireless device or a server.

The wireless device entity 101a, also referred to as a client, is located in a trusted zone of the wireless device 101. The wireless device entity 101a is located in the trusted zone and thereby acts as it is located there. The wireless device entity 101a may be a Central Processing Unit (CPU), a software, a firmware etc. The trusted zone is at least partly trusted by a first network node 103, i.e. it is at least semi-trusted. The zone may also be referred to as an area, a sector, a part, a region, a location or a collection of entities of the wireless device 101. That the zone is trusted refers to that the first network node 103 can be certain of, i.e. trust, that the wireless device entity 101a, which is comprised in the trusted zone, is a real wireless device entity and not a fraud or fake third party entity. For example, the trusted zone may be a modem part of the wireless device 101, which is considered to be a secure and trusted location of the wireless device 101 compared to the operating system or applications. The modem part may be located below a High Level Operating System (HLOS) (such as Android) in the wireless device 101. The modem part of the wireless device 101 may perform 3GPP signaling which is considered to be secure. Furthermore, a trusted zone may be a zone that is not easy to tamper with. For example, a trusted zone such as a modem zone is not easy to root, but a non-trusted zone such as e.g. an Android zone is easy to root and change code in. Entities in non-trusted parts of the wireless device 101 may be easily manipulated such that the communication from the entities in the non-trusted parts cannot be trusted by the first network node 103. The wireless device entity 101a may be uniquely identified with an entity ID. The trusted zone may also be referred to as a reliable zone, a dependable zone, a secure zone etc.

The wireless device entity 101a may be comprised in the wireless device 101 at manufacturing of the wireless device 101 or at some updating of the wireless device 101.

The wireless device 101 is adapted to be connected to the first network node 103. The first network node 103 may be a Packet data network GateWay (PGW), a Gateway General packet radio service Support Node (GGSN) or a co-located PGW and GGSN network node. The first network node 103 may therefore also be referred to as a gateway node. The PGW, also referred to as a PDN gateway, provides connectivity from the wireless device 101 to external Packet Data Networks (PDNs), i.e. it is the point of entry and exit of data traffic for the wireless device 101 for an LTE area. The wireless device may be connected to more than one PGW for accessing multiple PDNs. The PGW performs policy enforcement, packet filtering for each user, charging support, lawful interception, packet screening, and it acts as the anchor for mobility between 3GPP and non-3GPP technologies. The PGW may perform the same functions as the GGSN in GPRS. The GGSN enables transmission of Internet Protocol (IP) packets to external PDNs, such as e.g. the Internet, for a 3G area.

The first network node 103 may comprise at least one network node port 103a which may be dedicated to or reserved for certain types of communication, to certain applications, processes, wireless devices or network nodes etc. One purpose of the network node port 103a is to uniquely identify different applications or processes running on a single computer and thereby enable them to share a single physical connection to e.g. a packet-switched network like the Internet. The network node port 103a may be associated with an IP address of the host, as well as the type of protocol used for communication. The network node port 103a may be identified with a port number. The port number together with the IP address of the host of the communication completes the destination address for a communication session. The each network node port 103a may be opened or closed. The network node port 103a may be for example a Transmission Control Protocol (TCP) port, a User Datagram Protocol (UDP) port or a combined TCP and UDP port. TCP and UDP are transport layer protocols of the Internet protocol suite.

The wireless device 101 and the first network node 103 are adapted to communicate with each other using a secure communication channel. The secure communication channel may be Non Access Stratum (NAS) signaling. NAS signaling may be used to convey non-radio signaling in the communication network 100 and messages sent using NAS are encrypted using security algorithm. This secure communication channel is not used for the trusted communication between the wireless device entity 101a and the second network node 105. The trusted communication uses any communication channel to which the reserved network node port 103a is associated.

The first network node 103 is adapted to be connected to a second network node 105. The second network node 105 may be a network server or any other suitable network node or entity. In some embodiments, the first network node 103 and the second network node 105 are separate standalone network nodes. In other embodiments, the first network node 103 and the second network node 105 are co-located in one network node, i.e. the same network node. For example, the first network node 103 may be a GGSN and the second network node 105 is a node entity comprised in the GGSN.

It should be noted that the communication links between the wireless device 101, the wireless device entity 101a, the first network node 103 and the second network node 105 may be of any suitable kind including either a wired or wireless link. The links may use any suitable protocol depending on type and level of layer (e.g. as indicated by the Open Systems Interconnection (OSI) model) as understood by the person skilled in the art.

The method for enabling trusted communication between the wireless device entity 101a and the second network node 105 via the first network node 101 according to some embodiments will now be described with reference to the signaling diagram depicted in FIG. 2. The method comprises the following steps, which steps may as well be carried out in another suitable order than described below.

Step 200

The wireless device entity 101a blocks other entities in non-trusted zones of the wireless device 101 to access a specific network node port 103a in the first network node 103 which is reserved for the trusted communication between the wireless device entity 101a and the second network node 105. In some embodiments, a whole non-trusted zone may be blocked from accessing the reserved network node port 103a. For example, the wireless device entity 101a prohibits HLOS such as Android to use a specific TCP/UDP-port 103a. As a consequence of the prohibition, the first network node 103 can trust that all communication from this network node port 103a is done from the wireless device entity 101a.

Figure 2:
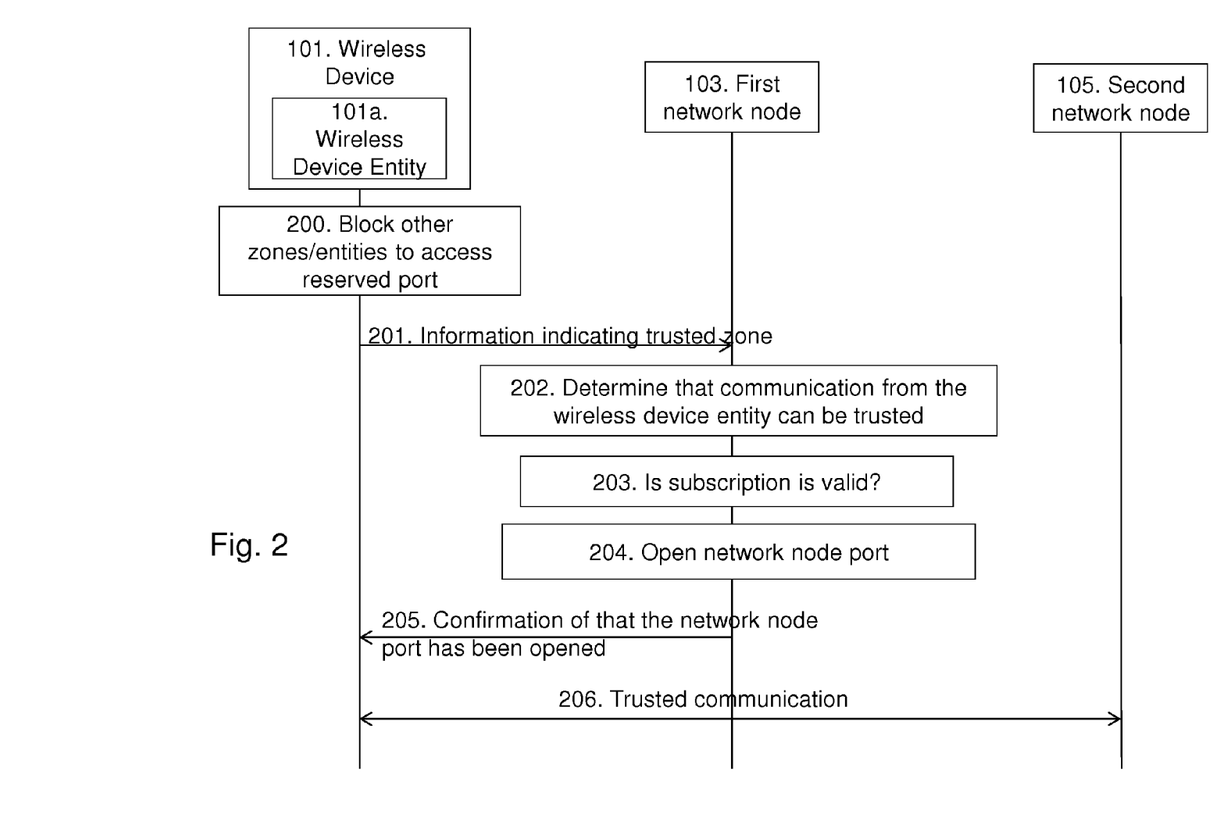
FIG. 2 is a signaling diagram illustrating embodiments of a method in the communication system.

This step 200 may be performed at start of the method or at any other suitable place in the method exemplified in FIG. 2. The non-trusted zones may be blocked as long as the service and/or the wireless device entity 101a in the wireless device 101 are active.

Step 201

The wireless device 101 transmits a message to the first network node 103 using the secure communication channel. The message comprises information indicating that the wireless device entity 101a is comprised in the trusted zone of the wireless device 101. The trusted zone is at least partly trusted by the first network node 103. The wireless device entity 101a resides in a trusted zone of the wireless device 101 where the wireless device entity 101a can add information to messages on the secure communication channel. This information is used to identify that the wireless device entity 101a resides in the trusted zone. Even though the wireless device entity 101a adds the information to the message, it is the wireless device 101 which transmits the message over the secure communication channel. Non-trusted zones of the wireless device 101 do not have access to the secure communication channel, non-trusted zones such as e.g. a HLOS.

The information indicating that the wireless device entity 101a is comprised in the trusted zone may be of any suitable format such as e.g. an Information Element (IE), a text string, a flag etc.

The information in this step 201 may be triggered by that the wireless device 101 is powered on and is setting up a connection towards the network, for instance a PDP context activation procedure. At power on, the wireless device 101 can be put into flight mode and the first network node 103 sets up any connection towards network.

Step 202

The first network node 103 receives the message from the wireless device 101 from step 201 and determines that communication from the wireless device entity 101a may be trusted since it has received information indicating that the wireless device entity 101a is comprised in the trusted zone.

Step 203

In some embodiments, the first network node 103 obtains information indicating that a subscription associated with the wireless device 101 is valid. In other words, the first network node 103 obtains information whether the user is authorized to use the wireless device entity 101a in the wireless device 101. In addition, parameters/settings may be shared between the first network node 103 and the wireless device entity 101a that is part of the subscription. The first network node 103 may obtain this information from e.g. a policy node such as a Policy and Charging Rules Function (PCRF), a Policy and Charging Enforcement Function (PCEF), a Home Location Register (HLR), a Home Subscriber Server (HSS), a Remote Authentication Dial In User Service (RADIUS) server or any other suitable network node.

Step 204

In some embodiments, the first network node 103 opens at least one network node port 103a which is to be reserved for the trusted communication between the wireless device entity 101a and the second network node 105, i.e. the network node port 103a changes its state from closed to open. Any other network nodes and other entities in the wireless device 101 are denied access to this reserved network node port 103a.

The determination of which network node port 103a that should be reserved for the trusted communication may be performed in different ways. For example, information indicating at least one random port may be sent in the NAS communication between the wireless device 101 and the first network node 103. This random port is the port that is reserved for the trusted communication. In another example, the network vendor and the vendor of the wireless device 101 and/or the vendor of the wireless device entity 101a agrees upon which network node port 103a that should be reserved for the secure communication.

Step 205

In some embodiments, the first network node 103 sends, to the wireless device 101, a confirmation of that the network node port 103a has been opened so that the wireless device entity 101a can communicate with the second network node 105.

An alternative to sending a confirmation is that the wireless device 101 itself performs a test if the network node port 103a has been opened.

Step 206

The wireless device entity 101a and the second network node 105 communicate with each other. The communication is trusted. The trusted communication may be conveyed via the reserved network node port 103a. For example, the trusted communication may be transmitted by the wireless device entity 101a to inform the second network node 105 about which application that is running in the wireless device 101. The second network node 105 can adjust the bandwidth according to the application. With the embodiments herein, the second network node 105 can trust that the communication comes from the true wireless device entity 101a and not from a fraud third party entity which tries to fool the second network node 105 to provide increased bandwidth although it is not necessary. This requires that non-trusted zones in the wireless device 101 are blocked from using the reserved network node port 103a, which is performed in step 200.

The trusted communication may also be referred to as reliable communication, dependable communication, secure communication etc.

Figure 3:
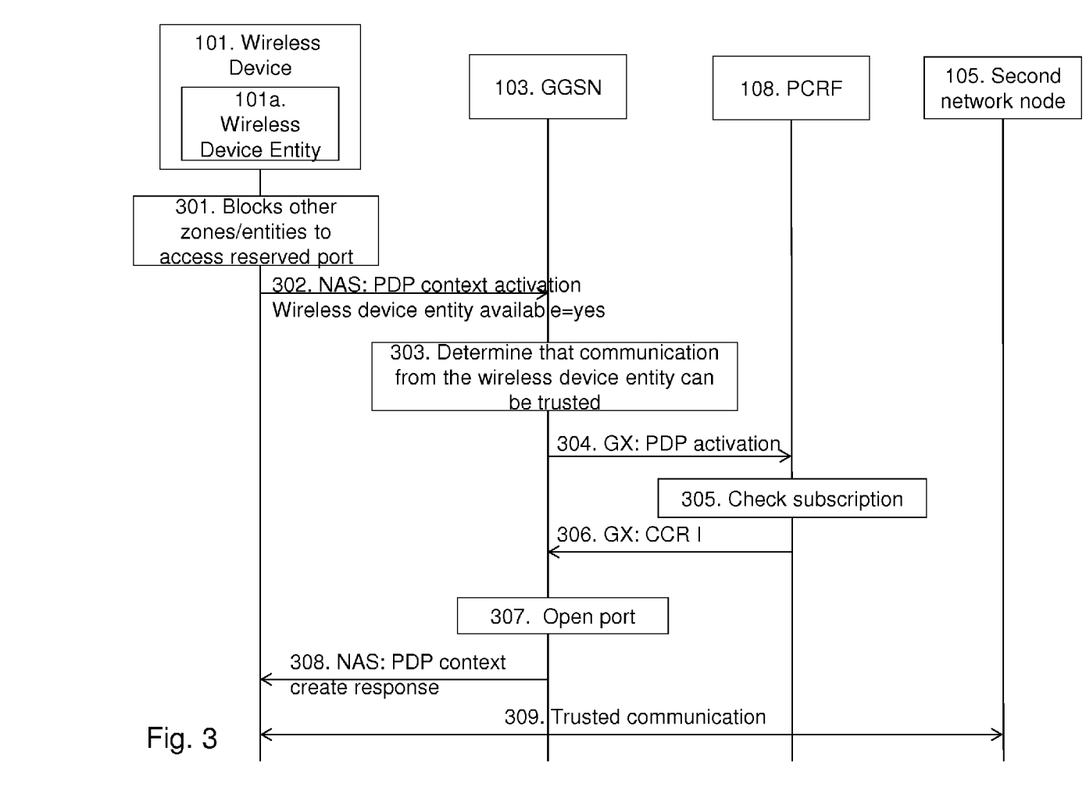
FIG. 3 is a signaling diagram illustrating embodiments of a method in the communication system.

The method for enabling trusted communication between the wireless device entity 101a and the second network node 105 via the first network node 101 according to some embodiments will now be described with reference to the signaling diagram depicted in FIG. 3. In FIG. 3, the communication network 100 is exemplified to implement WCDMA and the first network node 103 is represented by a GGSN. In FIG. 3, the first network node 103 is seen to communicate with a PCRF 108 (the PCRF 108 was not seen in FIG. 1 or 2). The method comprises the following steps, which steps may as well be carried out in another suitable order than described below.

Step 301

This step corresponds to step 200 in FIG. 2. The wireless device entity 101a blocks other entities in non-trusted zones of the wireless device 101 to access a specific network node port 103a in the GGSN 103 which is reserved for the trusted communication between the wireless device entity 101a and the second network node 105. In some embodiments, a whole non-trusted zone in the wireless device 101 may be blocked. For example, the wireless device entity 101a prohibits HLOS such as Android to use a specific TCP/UDP-port 103a. As a consequence of the prohibition, the GGSN 103 can trust that all communication from this network node port 103a is done from the wireless device entity 101a.

This step 301 may be performed at start of the method or at any other suitable place in the method exemplified in FIG. 3. The non-trusted zones may be blocked from accessing the reserved network node port 103a as long as the service and/or the wireless device entity 101a in the wireless device 101 are active.

Step 302

This step corresponds to step 201 in FIG. 2. The wireless device 101 transmits a message to the GGSN 103 using the NAS signal as the secure communication channel. The message may be a PDP context activation message comprising information which indicates that the wireless device entity 101a is located in the zone which is at least partly trusted by the GGSN 103. This information may be in the form of an Information Element (IE) where the value "yes" indicates that the wireless device entity 101a is located within the trusted zone, e.g. wireless device entity available=yes.

When the wireless device entity 101a resides in the trusted zone such as for example the modem part of the wireless device 101 it has the ability to write into e.g. the Protocol Configuration Options (PCO) used in the PDP context activation message. A message telling the GGSN 103 that the wireless device entity 101 resides in the trusted zone of the wireless device 101 might then be sent in the operator specific part of the PCO.

Step 303

This step corresponds to step 202 in FIG. 2. The GGSN 103 receives the message in step 302 and extracts the information indicating that the wireless device entity 101a is in the trusted zone. Thereby the GGSN 103 determines that it can trust that the wireless device entity 101a is running in the wireless device 101, i.e. that communication from the wireless device entity 101a can be trusted.

Step 304

This step corresponds to step 203 in FIG. 2. In some embodiments, it might be necessary for the GGSN 103 to check a subscription associated with the wireless device 101. In such embodiments, the GGSN 103 uses the Gx interface between the GGSN 103 and a PCRF 108 to transmit the PDP activation message to the PCRF 108 to request information whether the subscription is valid or not. The PDP activation may be sent using the Diameter protocol.

Step 305

This step corresponds to step 203 in FIG. 2. The PCRF 108 may check the validity of the subscription associated with the wireless device 101.

Step 306

This step corresponds to step 203 in FIG. 2. The PCRF 108 may send a response to the GGSN 103 using the Gx interface. The response may be in the form of a Credit Control Request Initial (CCRI) message. The CCRI message comprises the information of the validity of the subscription. Thus, the GGSN 103 knows whether the wireless device 101 has a valid subscription or not.

Step 307

This step corresponds to step 204 in FIG. 2. The GGSN 103 opens a connection from wireless device entity 101a to the second network node 105. The GGSN 103 opens the connection by opening the specific network node port 103a which is reserved for the trusted communication between the wireless device entity 101a and the second network node 105, since the GGSN 103 knows, from the NAS signaling, that the wireless device entity 101a is in the trusted zone. In some embodiments, a further criterion for opening the network node port 103*a* is that the wireless device 101 has a valid subscription. There may be one or more network node ports 103*a* which are reserved for this communication.

Step 308

In some embodiments, the GGSN 103 transmits a PDP context create response using the NAS signaling as the secure communication channel towards the wireless device 101. The PDP context create response is a response to the PDP activation message in step 302.

Step 309

This step corresponds to step 206 in FIG. 2. The wireless device entity 101*a* and the second network node 105 communicate with each other, i.e. exchange data with each other in way that it can be trusted that the communication really comes from the true wireless device entity 101*a* and not any fraud third party. This may also be seen as a fire wall protection. The trusted communication may be conveyed via the reserved network node port 103*a* which was opened in step 307.

Figure 4:
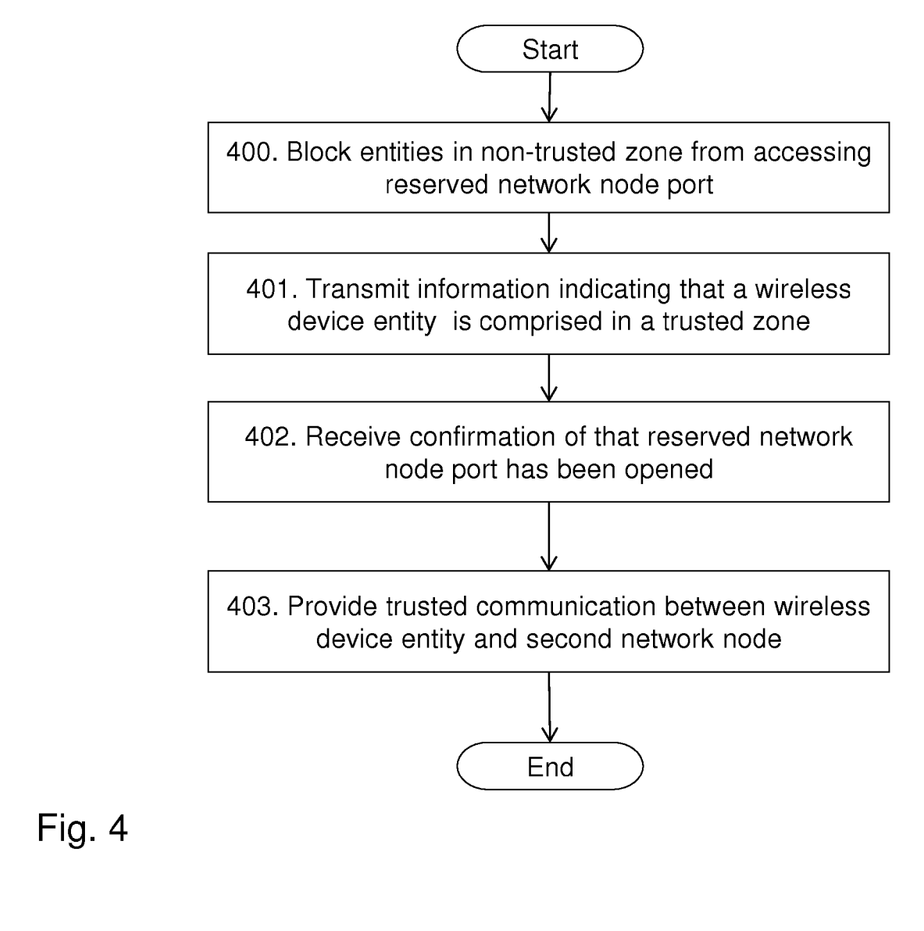
FIG. 4 is a flow chart illustrating embodiments of a method in a wireless device.

The method described above will now be described seen from the perspective of the wireless device 101. FIG. 4 is a flowchart describing the present method in the wireless device 101, for enabling trusted communication between the wireless device entity 101*a* and the second network node 105 via the first network node 103. The wireless device 101 and the first network node 103 are adapted to communicate using the secure communication channel. The first network node 103 and the second network node 105 may be co-located in one network node or the first network node 103 and the second network node 105 may each be standalone network nodes. The method comprises the following steps to be performed by the wireless device 101, which steps may be performed in any suitable order than described below:

Step 400

This step corresponds to step 200 in FIG. 2 and step 301 in FIG. 3. In some embodiments, the wireless device 101 blocks other wireless device entities in a non-trusted zone of the wireless device 101 from accessing a network node port 103*a* comprised in the first network node 103. The network node port 103*a* is reserved for the trusted communication between the wireless device entity 101*a* and the second network node 105. The nun-trusted zone is not trusted by the first network node 103.

Step 401

This step corresponds to step 201 in FIG. 2 and to step 302 in FIG. 3. The wireless device 101 transmits a message to the first network node 103 using the secure communication channel. The message comprises information indicating that the wireless device entity 101*a* is comprised in a trusted zone of the wireless device 101. The trusted zone is at least partly trusted by the first network node 103. The at least partly trusted zone may be a modem. The message may be a PDP context activation message. The information may be comprised in a PCO part of the PDP context activation message. Even though the PDP context activation is a message type associated with 3G, the PDP context activation message may also be used for other types of communication technology such as e.g. LTE and Wifi. Instead of the PDP context activation, any other suitable message type may be used.

Step 402

This step corresponds to step 205 in FIG. 2 and step 306 in FIG. 3. In some embodiments, the wireless device 101 receives a reply from the first network node 103. The reply comprises a confirmation of that the network node port 103*a* has been opened so that the wireless device entity 101 can communicate with the second network node 105 in a trusted way. The network node port 103*a* is to be reserved for the trusted communication between the wireless device entity 101*a* and the second network node 105.

The reply may be comprised in a PDP context create response message. Even though PDP context create response is a message type associated with 3G, the PDP context create response may also be used for other types of communication technology such as e.g. LTE and Wifi. Instead of the PDP context create response, any other suitable message type may be used.

An alternative to sending a confirmation is that the wireless device 101 itself performs a test if the network node port 103*a* has been opened.

Step 403

This step corresponds to step 206 in FIG. 2 and step 309 in FIG. 3. In some embodiments, the wireless device 101 communicates with the second network node 105 via a network node port 103*a* comprised in the first network node 103. The network node port 103*a* is reserved for the trusted communication between the wireless device entity 101*a* and the second network node 105.

Figure 5:
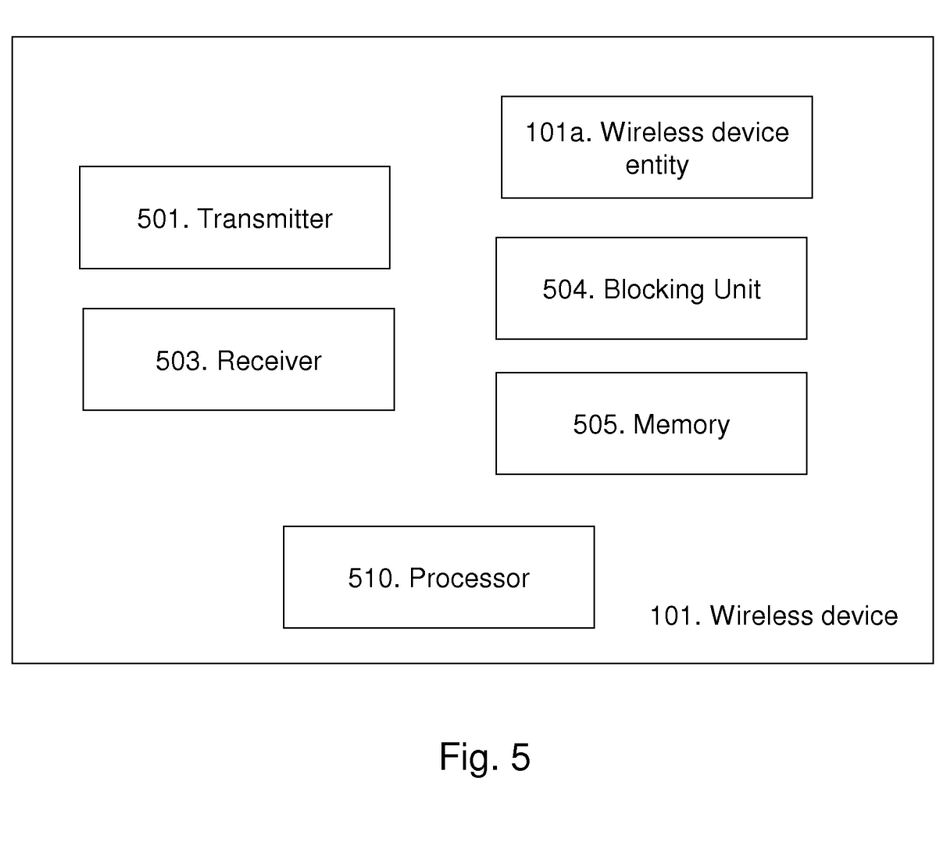
FIG. 5 is a schematic block diagram illustrating embodiments of a wireless device.

To perform the method steps shown in FIGS. 2, 3 and 4 for enabling trusted communication between the wireless device entity 101*a* and the second network node 105 via the first network node 103, the wireless device 101 comprises an arrangement as shown in FIG. 5. As mentioned above, the wireless device 101 and the first network node 103 are adapted to communicate using a secure communication channel. In some embodiments, the first network node 103 and the second network node 105 are co-located in one network node. In other embodiments, the first network node 103 and the second network node 105 are each standalone network nodes.

The wireless device 101 comprises a transmitter 501 which is adapted to transmit a message to the first network node 103 using the secure communication channel. The message comprises information indicating that the wireless device entity 101*a* is comprised in a trusted zone of the wireless device 101. The trusted zone is at least partly trusted by the first network node 103. The at least partly trusted zone may be a modem. The transmitted message may be a PDP context activation message. The information may be comprised in a PCO part of the PDP context activation message.

The wireless device entity 101*a* comprised in the wireless device 101 is adapted to transmit trusted communication to the second network node 105 via the network node port 103*a* comprised in the first network node 103. The network node port 103*a* is reserved for the trusted communication between the wireless device entity 101*a* and the second network node 105. The wireless device entity 101*a* may be further adapted to receive trusted communication from the second network node 105 via the network node port 103*a* comprised in the first network node 103.

The wireless device 101 may comprise a receiver 503 which is adapted to receive a reply from the first network node 103. The reply comprises a confirmation of that the network node port 103*a* has been opened so that the wireless device entity 101 can communicate with the second network node 105 in a trusted way. The network node port 103*a* is to be reserved for the trusted communication between the wireless device entity 101*a* and the second network node 105. The reply may be comprised in a PDP context create response message.

The wireless device 101 may comprises a blocking unit 504 adapted to block other wireless device entities in a non-trusted zone of the wireless device 101 from accessing the reserved network node port 103*a* comprised in the first network node 103. The network node port 103*a* is reserved for the trusted communication between the wireless device entity 101*a* and the second network node 105. The non-trusted zone is not trusted by the first network node 103.

The wireless device 101 may further comprise a memory 505 comprising one or more memory units. The memory 505 is arranged to be used to store data, received data streams, power level measurements, messages, replies, communication, information about trusted and non-trusted zones, information about a user associated with the wireless device 101, threshold values, time periods, configurations, scheduling, and applications to perform the methods herein when being executed in the wireless device 101.

Figure 6:
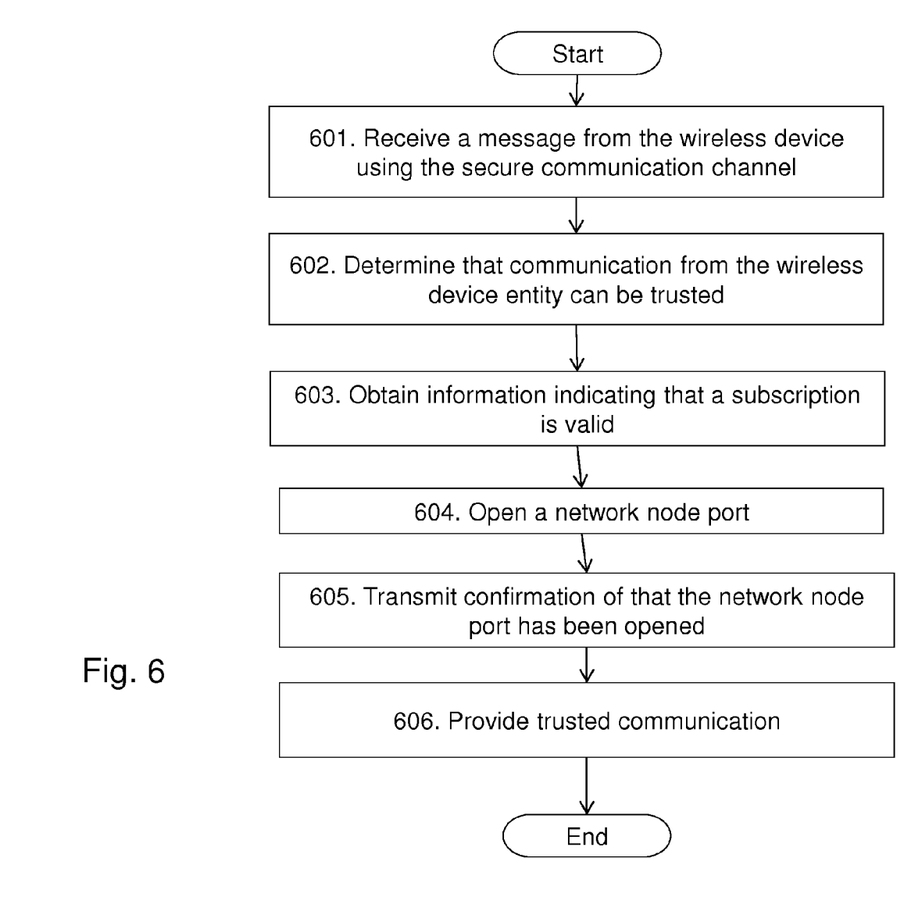
FIG. 6 is a flow chart illustrating embodiments of a method in a first network node.

The method described above will now be described seen from the perspective of the first network node 103. FIG. 6 is a flowchart describing the present method in the first network node 103 for enabling trusted communication between the wireless device entity 101*a* and the second network node 105 via the first network node 103. The wireless device 101 and the first network node 103 are adapted to communicate using the secure communication channel. The first network node 103 and the second network node 105 may be co-located in one network node, or the first network node 103 and the second network node 105 may each be standalone network nodes. The method comprises the following steps to be performed by the first network node 103, which steps may be performed in any suitable order than described below:

Step 601

This step corresponds to step 201 in FIG. 2 and to step 302 in FIG. 3. The first network node 103 receives a message from the wireless device 101 using the secure communication channel. The message comprises information indicating that the wireless device entity 101*a* is comprised in a trusted zone of the wireless device 101. The trusted zone is at least partly trusted by the first network node 103. The received message may be a PDP context activation message. The information indicating that the wireless device entity 101*a* may be comprised in the wireless device 101 is comprised in the PCO part of the PDP context activation message.

Step 602

This step corresponds to step 202 in FIG. 2 and step 303 in FIG. 3. In some embodiments, the first network node 103 determines that communication from the wireless device entity 101*a* can be trusted since it has received the information indicating that the wireless device entity 101*a* is comprised in the trusted zone of the wireless device 101.

Step 603

This step corresponds to step 203 in FIG. 2 and to steps 303 and 305 in FIG. 3. In some embodiments, the first network node 103 obtains information indicating that a subscription associated with the wireless device 101 is valid.

Step 604

This step corresponds to step 204 in FIG. 2 and step 307 in FIG. 3. In some embodiments, when the communication from the wireless device entity 101*a* is determined to be trusted, the first network node 103 opens the network node port 103*a* comprised in the first network node 103. The network node port 103*a* is to be reserved for the trusted communication between the wireless device entity 101*a* and the second network node 105, i.e. blocked for entities in non-trusted zones of the wireless device 101.

Step 605

This step corresponds to step 205 in FIG. 2 and step 306 in FIG. 3. In some embodiments, the first network node 103 transmits a reply to the wireless device 101. The reply comprises a confirmation of that the network node port 103*a* has been opened so that the wireless device entity 101 can communicate with the second network node 105. The reply may be comprised in a PDP context create response message.

Step 606

This step corresponds to step 206 in FIG. 2 and step 309 in FIG. 3. In some embodiments, the first network node 103 provides the trusted communication between the wireless device entity 101*a* and the second network node 105 via the opened network node port 103*a*.

Figure 7:
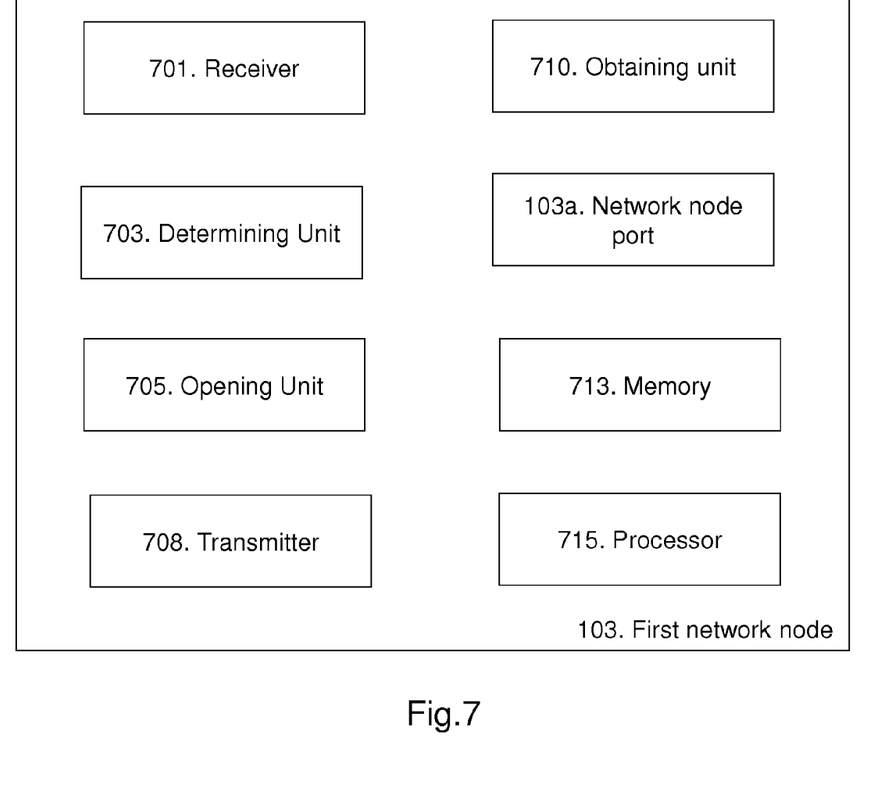
FIG. 7 is a schematic block diagram illustrating embodiments of a first network node.

To perform the method steps shown in FIGS. 2, 3 and 6 for enabling trusted communication between the wireless device entity 101*a* and the second network node 105 via the first network node 103, the first network node 103 comprises an arrangement as shown in FIG. 7. As mentioned above, the wireless device 101 and the first network node 103 are adapted to communicate using the secure communication channel. In some embodiments, the first network node 103 and the second network node 105 are co-located in one network node. In other embodiments, the first network node 103 and the second network node 105 are each standalone network nodes.

The first network node 103 comprises a receiver 701 which is adapted to receive a message from the wireless device 101 using the secure communication channel. The message comprises information indicating that the wireless device entity 101*a* is comprised in a trusted zone of the wireless device 101. The trusted zone is at least partly trusted by the first network node 103. The received message may be a PDP context activation message. The information indicating that the wireless device entity 101*a* is comprised in the wireless device 101 may be comprised in a PCO part of the PDP context activation message. The receiver 701 may be further adapted to receive the trusted communication from the wireless device entity 101*a* and the second network node 105 via an opened network node port 103*a*.

The first network node 103 comprises a determining unit 703 which is adapted to determine that communication from the wireless device entity 101*a* can be trusted since it has received the information indicating that the wireless device entity 101*a* is comprised in the trusted zone of the wireless device 101.

The first network node 103 may comprise an opening unit 705 which is adapted to open a network node port 103*a* which is to be reserved for the communication between the wireless device entity 101*a* and the second network node 105 when the communication from the wireless device entity 101*a* is determined to be trusted.

The first network node 103 may comprise a transmitter 708 adapted to transmit a reply to the wireless device 101. The reply comprises a confirmation of that the network node port 103*a* has been opened so that the wireless device entity 101*a* can communicate with the second network node 105. The reply may be comprised in a PDP context create response message. The transmitter 708 may be further adapted to transmit the trusted communication from the wireless device entity 101*a* and the second network node 105 via the opened network node port 103*a*.

The first network node 103 may further comprise an obtaining unit 710 adapted to obtain information indicating that a subscription associated with the wireless device 101 is valid.

The first network node 103 may further comprise a memory 713 comprising one or more memory units. The memory 713 is arranged to be used to store data, received data streams, power level measurements, messages, replies, communication, information about trusted and non-trusted zones, information about a user associated with the wireless device 101, threshold values, time periods, configurations, scheduling, and applications to perform the methods herein when being executed in the first network node 103.

The present mechanism for enabling trusted communication between the wireless device entity 101a and the second network node 105 via the first network node 103 may be implemented through one or more processors, such as a processor 510 in the wireless device arrangement depicted in FIG. 5 and a processor 715 in the first network node arrangement 800 depicted in FIG. 7, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the wireless device 101 and/or the first network node 103. One such carrier may be in the form of a CD ROM disc. It is however feasible with other data carriers such as a memory stick. The computer program code can furthermore be provided as pure program code on a server and downloaded to the wireless device 101 and/or the first network node 103.

Summarized, the embodiment herein builds on that if a wireless device entity 101a in the modem or other trusted zones of the wireless device 101 can be seen as fool proof unbreakable, then it is possible to utilize a secure communication channel to authenticate that this wireless device entity 101a resides in the wireless device 101. One such near fool proof unbreakable wireless device entity 101a is if a wireless device entity 101a resides in the firmware or software in the modem part below HLOS (such as Android) in the wireless device 101.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The term "configured to" used herein may also be referred to as "arranged to" or "adapted to".

It should also be emphasised that the steps of the methods defined in the appended claims may, without departing from the embodiments herein, be performed in another order than the order in which they appear in the claims.

The invention claimed is:

1. A method in a wireless device for enabling trusted communication between a wireless device entity and a second network node via a first network node, wherein the wireless device and the first network node are adapted to communicate using a secure communication channel, and wherein the wireless device comprises a trusted zone and a non-trusted zone, the method comprising:
   transmitting a message to the first network node using the secure communication channel, wherein the message comprises information indicating that the wireless device entity is comprised in the trusted zone of the wireless device, wherein the trusted zone is at least partly trusted by the first network node and the non-trusted zone is not trusted by the first network node, and wherein the first network node is a Packet data network GateWay (PGW), a Gateway General packet radio service Support Node (GGSN) or a co-located PGW and GGSN network node;
   providing trusted communication between the wireless device entity and the second network node via a network node port comprised in the first network node;
   blocking other wireless device entities in the non-trusted zone of the wireless device from accessing the network node port comprised in the first network node, wherein the network node port is reserved for the trusted communication between the wireless device entity and the second network node; and
   receiving a reply from the first network node, wherein the reply comprises a confirmation that a network node port has been opened so that the wireless device entity can communicate with the second network node,
   wherein the reply is comprised in a Packet Data Protocol, PDP, context create response message, the message is a Packet data protocol, PDP, context activation message, and the information is comprised in a Protocol Configuration Options, PCO, part of the PDP context activation message.

2. The method according to claim 1, wherein the at least partly trusted zone is a modem.

3. The method according to claim 1, wherein the first network node and the second network node are co-located in one network node; or
   wherein the first network node and the second network node are each standalone network nodes.

4. A method in a first network node for enabling trusted communication between a wireless device entity and a second network node via the first network node, wherein the first network node and a wireless device are adapted to communicate using a secure communication channel, and wherein the wireless device comprises a trusted zone and a non-trusted zone, the method comprising:
   the first network node receiving a message from the wireless device using the secure communication channel, wherein the message comprises information indicating that the wireless device entity is comprised in the trusted zone of the wireless device, and wherein the trusted zone is at least partly trusted by the first network node;
   the first network node determining that communication from the wireless device entity can be trusted since it has received the information indicating that the wireless device entity is comprised in the trusted zone of the wireless device;
   as a result of determining that the communication from the wireless device entity is to be trusted, the first network node opening a network node port comprised in the first network node, wherein the network node port is reserved for the trusted communication between the wireless device entity and the second network node, wherein other wireless device entities in the non-trusted zone of the wireless device are blocked from accessing the network node port, and wherein the first network node is a Packet data network GateWay (PGW), a Gateway General packet radio service Support Node (GGSN) or a co-located PGW and GGSN network node; and transmitting a reply to the wireless device, wherein the reply comprises a confirmation that the network node port has been opened so that the wireless device entity can communicate with the second network node, wherein the reply is comprised in a Packet Data Protocol, PDP, context create response message, the received message is a Packet data protocol, PDP, context activation message, and the information indicating that the wireless device entity is comprised in the trusted zone of the wireless device is comprised in a Protocol Configuration Options, PCO, part of the PDP context activation message.

5. The method according to claim 4, further comprising: obtaining information indicating that a subscription associated with the wireless device is valid.

6. The method according to claim 4, further comprising: providing the trusted communication between the wireless device entity and the second network node via the opened network node port reserved for the trusted communication between the wireless device entity and the second network node.

7. The method according to claim 4, wherein the first network node and the second network node are co-located in one network node; or
wherein the first network node and the second network node are each standalone network nodes.

8. A wireless device adapted to enable trusted communication between a wireless device entity and a second network node via a first network node, wherein the wireless device and the first network node are adapted to communicate using a secure communication channel, and wherein the wireless device comprises a trusted zone and a non-trusted zone, the wireless device comprising:
a transmitter;
a receiver;
memory;
processing circuitry coupled to the transmitter, the receiver, and the memory, wherein the processing circuitry is configured to:
employ the transmitter to transmit a message to the first network node using the secure communication channel, wherein the message comprises information indicating that the wireless device entity is comprised in the trusted zone of the wireless device, wherein the trusted zone is at least partly trusted by the first network node and the non-trusted zone is not trusted by the first network node, and wherein the first network node is a Packet data network GateWay (PGW), a Gateway General packet radio service Support Node (GGSN) or a co-located PGW and GGSN network node;
employ the transmitter to transmit trusted communication to the second network node via a network node port comprised in the first network node, wherein the network node port is reserved for the trusted communication between the wireless device entity and the second network node
employ the receiver to receive trusted communication from the second network node via the reserved network node port comprised in the first network node;
block other wireless device entities in the non-trusted zone of the wireless device from accessing the network node port comprised in the first network node; and
employ the receiver to receive a reply from the first network node, wherein the reply comprises a confirmation that a network node port has been opened so that the wireless device entity can communicate with the second network node, wherein the reply is comprised in a Packet Data Protocol, PDP, context create response message, the transmitted message is a Packet data protocol, PDP, context activation message, and the information is comprised in a Protocol Configuration Options, PCO, part of the PDP context activation message.

9. The wireless device according to claim 8, wherein the at least partly trusted zone is a modem.

10. The wireless device according to claim 8, wherein the first network node and the second network node are co-located in one network node; or wherein the first network node and the second network node are each standalone network nodes.

11. A first network node adapted to enable trusted communication between a wireless device entity and a second network node via the first network node, wherein the first network node and a wireless device are adapted to communicate using a secure communication channel, and wherein the wireless device comprises a trusted zone and a non-trusted zone, the first network node comprising:
a receiver;
a transmitter;
memory;
processing circuitry coupled to the receiver, the transmitter, and the memory, wherein the processing circuitry is configured to:
employ the receiver to receive a message from the wireless device using the secure communication channel, wherein the message comprises information indicating that the wireless device entity is comprised in the trusted zone of the wireless device, and wherein the trusted zone is at least partly trusted by the first network node;
determine that communication from the wireless device entity can be trusted since it has received the information indicating that the wireless device entity is comprised in the trusted zone of the wireless device;
as a result of determining that the communication from the wireless device entity is to be trusted, open a network node port which is to be reserved for the trusted communication between the wireless device entity and the second network node when the communication from the wireless device entity is determined to be trusted, wherein other wireless device entities in the non-trusted zone of the wireless device are blocked from accessing the network node port, and wherein the first network node is a Packet data network GateWay (PGW), a Gateway General packet radio service Support Node (GGSN) or a co-located PGW and GGSN network node; and
employ the transmitter to transmit a reply to the wireless device, wherein the reply comprises a confirmation that the network node port has been opened so that the wireless device entity can communicate with the second network node, wherein the reply is comprised in a Packet Data Protocol, PDP, context create response message, the received message is a Packet data protocol, PDP, context activation message, and the information indicating that the wireless device entity is comprised in the trusted zone of the wireless device is comprised in a Protocol Configuration Options, PCO, part of the PDP context activation message.

12. The first network node according to claim 11, the processing circuitry further configured to:
obtain information indicating that a subscription associated with the wireless device is valid.

13. The first network node according to claim 11, the processing circuitry further configured to:
- employ the receiver to receive the trusted communication from the wireless device entity and the second network node via the opened network node port reserved for the trusted communication between the wireless device entity and the second network node; and
- employ the transmitter to transmit the trusted communication from the wireless device entity and the second network node via the opened network node port.

14. The first network node according to claim 11, wherein the first network node and the second network node are co-located in one network node; or wherein the first network node and the second network node are each standalone network nodes.

* * * * *